United States Patent [19]
Lee et al.

[11] Patent Number: 6,138,234
[45] Date of Patent: Oct. 24, 2000

[54] NODE BOOTING METHOD IN HIGH-SPEED PARALLEL COMPUTER

[75] Inventors: Jae Kyung Lee; Hae Jin Kim; Suk Han Yoon; Chee Hang Park, all of Daejon-Shi, Rep. of Korea

[73] Assignee: Electronics and Telecommunications Research Institute, Daejon, Rep. of Korea

[21] Appl. No.: 09/139,726

[22] Filed: Aug. 31, 1998

[30] Foreign Application Priority Data

Nov. 25, 1997 [KR] Rep. of Korea ................. 97-62899

[51] Int. Cl.[7] ................................................ G06F 9/445
[52] U.S. Cl. ................................................... 713/2
[58] Field of Search ........................................ 713/2

[56] References Cited

U.S. PATENT DOCUMENTS

| | | | |
|---|---|---|---|
| 5,142,680 | 8/1992 | Ottman et al. . | |
| 5,146,568 | 9/1992 | Flaherty et al. . | |
| 5,675,800 | 10/1997 | Fisher, Jr. et al. ...................... | 713/2 |
| 5,958,049 | 9/1999 | Mealey et al. .......................... | 713/1 |
| 5,978,912 | 11/1999 | Rakavy et al. .......................... | 713/2 |

*Primary Examiner*—Thomas M. Heckler
*Attorney, Agent, or Firm*—Jacobson, Price, Holman & Stern, PLLC

[57] ABSTRACT

There is disclosed a node booting method in a high-speed parallel computer. Other than the method in which the system using a conventional network down loads the operating system kernel image from the boot server, the method according to the present invention provides an environment by which a boot can be progressed in parallel and a boot progress state can be monitored through a console terminal, thus improving a boot speed. The node booting method according to the present invention is comprised of a first step of finding a logical boot path using a node construction table managed by a firmware; a second step of determining boot subject nodes so that copy of an operating system kernel image can be made simultaneously; a third step of copying effective portions of the operating system loaded at the memories onto the subject nodes; a fourth step of informing a boot node of the node state and to display the boot progress state on a console terminal at the start and end time of the booting; and a fifth step of simultaneously starting execution at the remaining portions of the copied operating system when the kernel image are completely copied onto all the nodes.

1 Claim, 4 Drawing Sheets

NODE BOOTING METHOD IN HIGH-SPEED PARALLEL COMPUTER

BACKGROUND OF INVENTION

1. Field of the Invention

The present invention relates to a node booting method in a high-speed parallel computer, and more particularly to a node booting method of an operating system in a high-speed parallel computer which can impartially manage shared resources within the system and also display a boot progress state on a console terminal, thus providing a user-friendly system manager interface.

2. Description of the Prior Art

Typically, in a MPP (Massively Parallel Processing) system in which a plurality of nodes constitute a single system via an interconnect network, such as SPAX, it is important to minimize the time that all the nodes take to load an operating kernel image onto their memories. Also, there is a need for a method by which each node can copy a same operating system kernel image from the operating system onto its memory simultaneously when it can start executing the operating system simultaneously, thus making it possible to share resources managed by all the nodes and also to manage the state at which a booting is in progress. In view of technical aspect, in order for the node boot to be executed in parallel in loading the same kernel image onto the memories of all the nodes, there are several requirements; information on the nodes constituting the system must be used so that the nodes of the subject matter to be copied can be decided; the boot path must be decided so that the boot progress by the other nodes should not be obstructed while the booting is in progress and a support on an internodes communication method by a firmware should be provided since the booting is progressed by the firmware of each node.

In a conventional node booting technique, a method has been used by which a communicating driver down loads a minimum boot code to a boot server simultaneously with the start-up of the system and then loads a kernel image of an operating system in an imaginary disk filing system onto respective memories of the nodes via a disk of a remote node. However, in the imaginary disk scheme, as several nodes request to read a disk for the single boot server at the same time, there are problems that it thereby degrades a lowered booting speed and also necessitates a complicated communicating driver by which a firmware can support this.

Therefore, a new method has been desired by which a kernel image of an operating system can be loaded onto a memory from a boot disk in a boot node, a same kernel image can be copied onto all the nodes constituting the system, while a node booting for several nodes can be performed in parallel in order to reduce a booting time, simultaneous execution of the kernel of the operating system can be made by all the nodes and also the state at which the boot is in progress can be monitored using a console terminal connected to the boot node, even by a conventional method.

SUMMARY OF THE INVENTION

It is therefore an object of the present invention to solve the problems involved in the prior art, and to provide a method which, in a high-speed parallel computer, can copy a same kernel image of an operating system onto the memories of all the nodes constituting a system and also can synchronize execution of the operating system; and a method of booting a node, which can monitor the progress state during a node booting via a console terminal.

To achieve the above object, the node booting method according to the present invention is characterized in that it comprises a first step of finding a logical boot path using a node construction table managed by a firmware; a second step of determining boot subject nodes so that copy of an operating system kernel image can be made simultaneously; a third step of copying effective portions of the operating system loaded at the memories onto the subject nodes; a fourth step of informing a boot node of the node state and to display the boot progress state on a console terminal at the start and end time of the booting; and a fifth step of simultaneously starting execution at the remaining portions of the copied operating system when the kernel image are completely copied onto all the nodes.

BRIEF DESCRIPTION OF THE DRAWINGS

The above object, and other features and advantages of the present invention will become more apparent by describing the preferred embodiment thereof with reference to the accompanying drawings, in which.

Similar reference characters refer to similar parts in the several views of the drawings.

DETAILED DESCRIPTION OF PREFERRED EMBODIMENT

A preferred embodiment of the present invention will be explained in detail by reference to the accompanying drawings.

Figure 1:
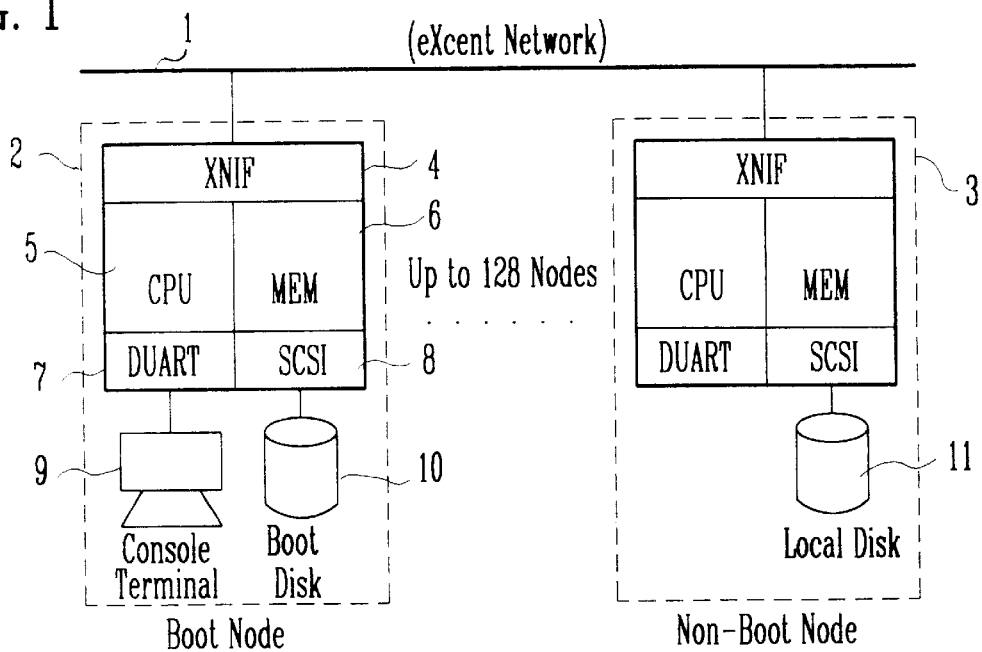
FIG. 1 shows a system construction of a high-speed parallel computer according to the present invention.

FIG. 1 shows a system construction of a high-speed parallel computer (SPAX) to which a node booting method of the present invention is applied.

SPAX is a parallel computer of a clustering type in which up to 128 nodes 2 are connected to a hierarchical crossbar connection network 1 having a SMP (Symmetric Multi-Processor) structure, in which four Intel Pentium-Pro processors 5 share a memory 6 up to 1 Gbytes per node. For internodes communication, all the nodes have a XNIF 4 (eXcent Network InterFace), and are adapted to provide a point-to-point and broadcast communication with respect to control message and to transmit/receive message through a point-to-point communication to a maximum of 1 Mbytes with respect to data message.

Figure 2:
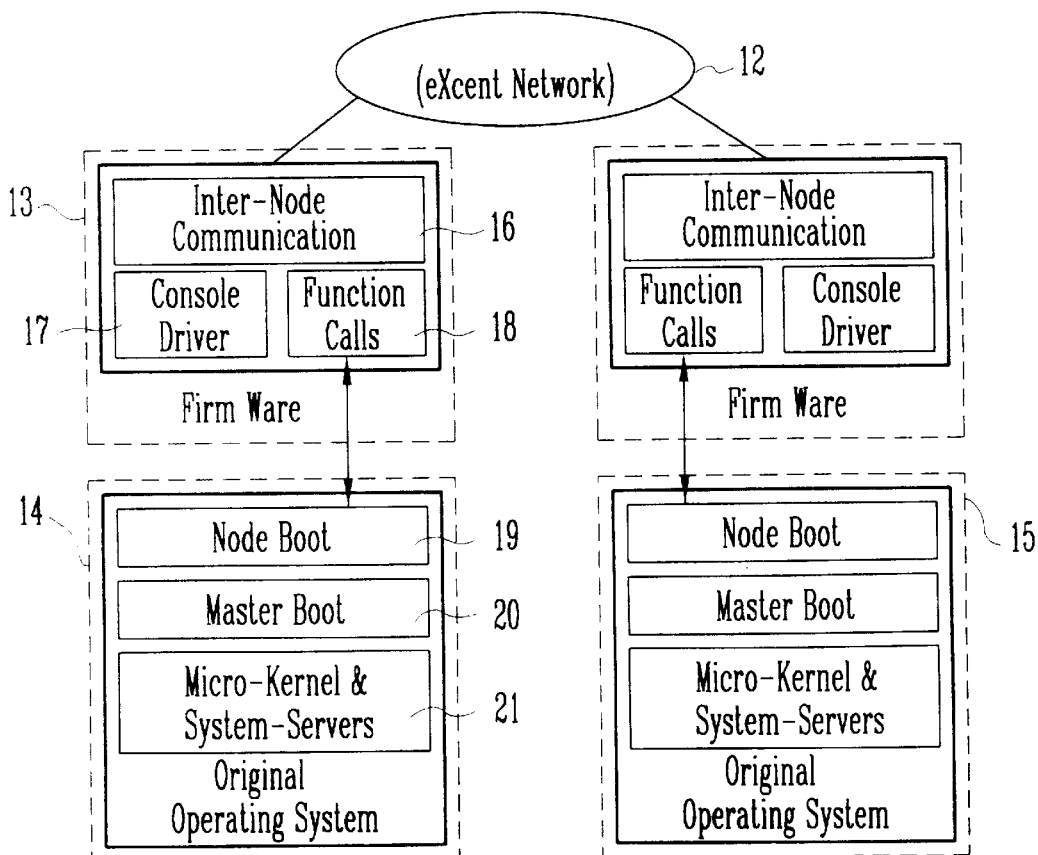
FIG. 2 shows an interface between a node boot and an operating system.

FIG. 2 shows an interface among a firmware 13, a node boot 19 and an operating system 14. The high-speed parallel computer has a distributed memory 6 and the nodes are connected by a high-speed interconnecting network 12 each other. For booting an operating system, a firmware 13 loads a kernel image 14 of the operating system onto the memory 6 of the boot node 2 from the boot disk 10. Before the operating system can execute, the firmware provides primitives for internodes communication 16, wherein a message transmission/reception between nodes is made possible using a firmware function call 18. The node boot 19 is located at the start of the operating system, so that a same environment can be always maintained in the process of copy and execution. The detained process of the node booting will be described in detail in FIG. 4.

Figure 3:
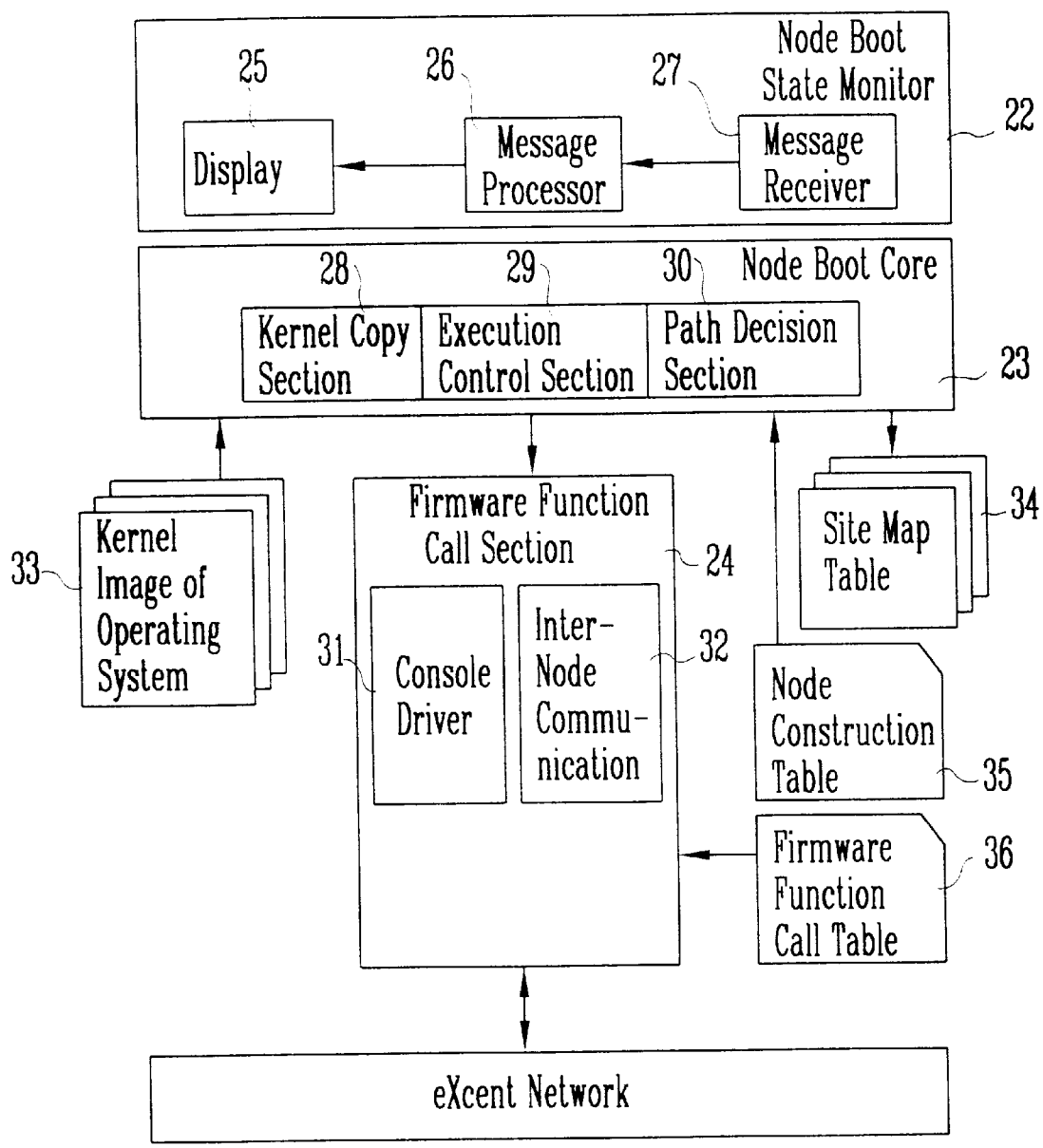
FIG. 3 shows a construction of a node boot.

FIG. 3 shows a construction of a node boot, which is mainly consisted of a firmware function call section 24, a node boot core 23 and a node boot state monitor 22. The firmware function call section 24 makes it possible to use a serial port input/output port 31 for sending characters to display the boot state on the console terminal 9 and to use an internode communication primitives 32 of the firmware for the procedure such as copying and controlling of a kernel image of the operating system 33 to other nodes 3, and is also responsible for an interface which allows a firmware function call table 36 managed by the firmware to be used for an interface. The boot core 23 writes a site map table 34 to decide a boot order with respect to the nodes mounted to the system using a node construction table 35 within the system created by the firmware. The site map table is written by the boot node and is made in the form of a table having a binary tree format so that the node booting can be executed in parallel. In the process of duplicating the operating system image 33 onto the nodes consisted of up to 128 in number, respective nodes must decide the boot order so that the time taken to boot the nodes can be minimized in such a way that the sum of the time to wait for the time when the operating system image is copied onto his node, of the time taken to copy the operating system image onto other nodes and then of the time to wait for the time when the operating system image is completely copied onto all the nodes, can made equal. When respective nodes decide 30 the node for whom he has to copy and finish duplicating 28 onto the assigned node, it informs the boot node 2 of the result and then the boot node writes it into the site map table 34. When the boot node 2 receives a boot complete notification 27 from all the nodes by tracing the site map table, it sends a broadcast control message so that the nodes at wait-state can start the operating system 29 and enters an operating system mode. The boot state monitor 22 displays an IDLE state on the console terminal 9 for the nodes connected to the system, and instructs the console terminal to display 25 the subject node at a boot active state by informing the boot node 2 of it when each node starts duplicating onto other nodes. At this time, it should be made that the relationship between nodes can be monitored by displaying the node which performs copy for the node for which copy is performed. When each node finishes the process of duplicating onto other nodes, it informs the boot node of the fact that he enters the wait state, so that the boot node can display a Wait state and identify 26 the node which finished the booting to write the result into the site map table 34.

Figure 4:
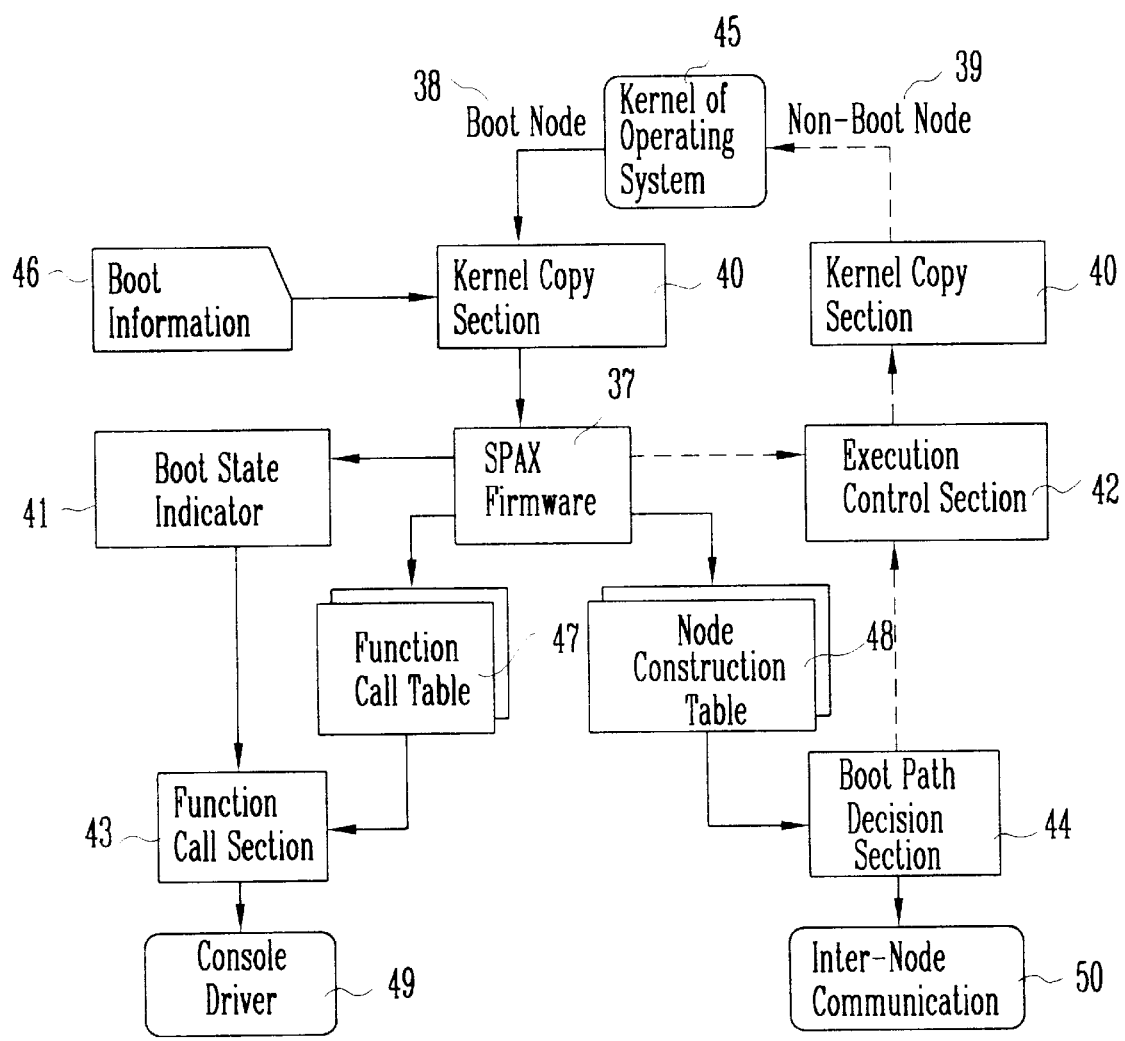
FIG. 4 shows a procedure of a node booting.

Referring now to FIG. 4, there is shown a procedure of a node booting. By reference to FIG. 4, the node booting procedure for each node will be explained as follows. The node booting, in which the boot node 38 copies a same operating system kernel image 45 onto the non-boot node 39, simultaneously executes the copied kernel image 45 and monitors the progress state, may be classified into two steps; the first step is one in which the boot node 38 processes, wherein the kernel copy section 40 refers to the boot information 46 taken over to the node boot, by a conventional booting method, in the process of booting the operating system kernel image 45 loaded into the memory of the boot node. Then the operating system kernel image 45 uses the communication between nodes 50 of the firmware 37 to copy only the portion occupied by the memory onto the subject node. In order for the boot node 38 to copy the kernel image 45 onto the other nodes and execute the copied kernel, the execution control section 42 refers to the node construction table 48 and then uses the internodes communication 50 in the boot path decision section 44. If the boot node starts duplicating onto other nodes there is no further subject node to be copied, the non-boot node notifies a copy completion to the boot node. The boot node of which a boot progress state is informed from the other nodes constitutes a screen to display on the console terminal and then gives it to a function call section 43 of the firmware via a state indicator 41. The function call section 43 provides an interface capable of calling a firmware function, in which the function call table 47 provided by the firmware is referred so that characters can be sent to the console driver 49. The second step is one in which the operating system kernel image 45 is copied from the boot node and then loaded into his memory, in which the execution control section 42 receives message through the internodes communication 50 of the firmware 37 and then uses the kernel copy section 40 to receive a same operating system kernel image 45 as in the boot node. The copied operating system kernel acts as a boot node so that it receives an execution start instruction from the boot node and then copies the copy again onto another nodes by the execution control section 42. The entire processes are repeated until there is no further node to be copied. If there is no further node to be copied thereto, the operating system kernel notifies the copy completion to the boot node and then displays the change in the boot state. Then, it waits for until it receives the notification that all the nodes has been completely copied. If it receives the notification that all the nodes has been completely copied, it enter an operating system mode by executing the master boot 20 being the remaining portion of the copied operating system.

Figure 5:
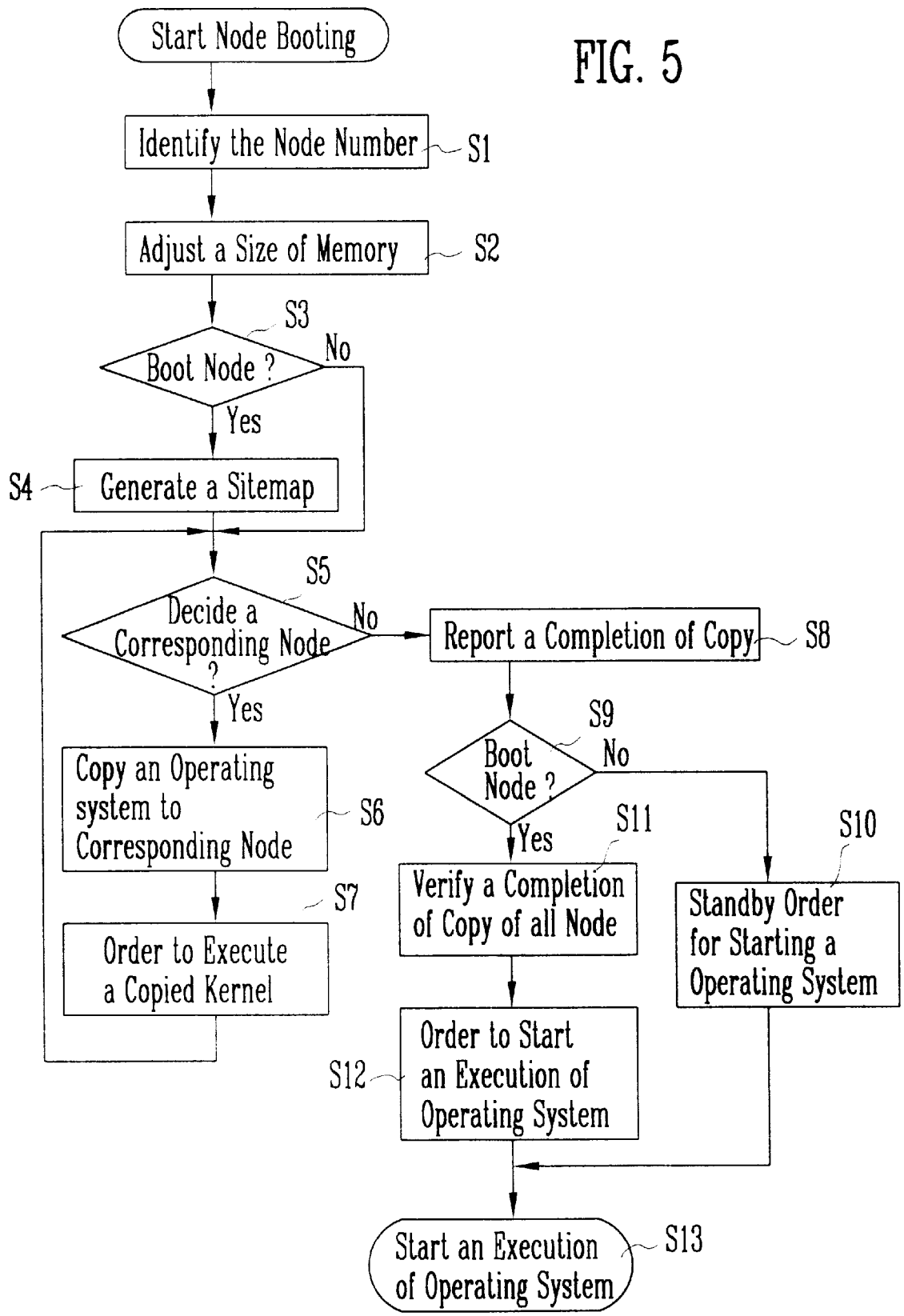
FIG. 5 shows a control flow of a node booting.

FIG. 5 shows a control flow of a node booting. The operating system 14 operating at the high-speed parallel computer is consisted of the node boot 19, the master boot 20, the micro-kernel, and several system-servers 21. The node boot 19 is a code executing a serial process of copying onto all the nodes which are connected to the system after being loaded onto the memory of the boot node, which is executed with being located well in advance than the code of the master boot 30. Therefore, the original operating system 14 loaded from the boot disk 10 and it copy operating system 15 receives a control from the firmware and then executes the node boot code at the start portion of the operating system, so that the node booting can begin. All the nodes are adapted to have different node numbers when being mounted onto the system. Each node reads the register provided by the XNIF 4 to identify the node number S1. The node construction table managed by the firmware is order in sequence with respect to the 128 nodes and has an effective information on each node. Among this, information on the capacity off the memory mounted to the node is reflected as an actually mounted size of memory since the actual memory size being the portion of the boot information 46 may be transferred differently due to the kernel image copy if each node has a different size of memory. The boot information is a portion which is copied onto other nodes along with the operating system image in the process of booting nodes and is later used by the master boot 20 code of the operating system. At this time, the node having the original operating system 14 becomes a boot node, which then refers to the node construction able 35 managed by the firmware and writes a logical node construction table into a site map table 34 in the form of binary tree format, so that the time taken to boot the nodes actually mounted thereon and operated can be minimized. The site map table 34 is the most important part in determining the boot path. The site map table is written as a part of the node boot code, and is transferred to other node along with the copy procedure. The boot path is a procedure by which each node determines a subject node to which a kernel image will be copied, which makes it possible to select a path passing through without copy or interference depending on the characteristic of the crossbar switch network and is written to provide a policy by which the SPAX operating system having a size of 6 Mbytes can be copied into all the nodes as soon as possible. Depending on the site map written and managed by in the format of binary tree, all the nodes determines S5 the node to be copied, in which during the process, the copy is spreaded in parallel all the nodes by 2 times, suitably for the binary tree characteristic. The node starting at the a copy of the operating system 15 becomes a non-boot node 3, which a separate site number of a logical node number corresponding to his own node number among the site map which is written by the boot node and then transferred during the process of copying the kernel image. As the boot node receives a boot completion notification from all the nodes while managing the site map, each node informs the boot node of the notification on his own boot progress state with a site number. After each node copies the kernel image mounted onto his own memory by means of the internode communication protocol of the XNIF 4 until there is no any node which has to be managed by himself S5, it sends a message for instructing to execute the node code of the kernel image onto which a subject node is copied S7. If there is no any subject node for whom a copy will be made, it reports a copy completion to the boot node S8. Depending on whether he is a boot node or a non-boot node, if he is a boot node S9, the node for whom a copy is completed receives a boot completion report from all the nodes to mark a corresponding node in the boot state monitor with a wait state and then to mark a boot completion to the site map. If the boot completion report is received from all the nodes S11, it sends a broadcast message by which execution by each node is instructed to start from the master boot 20 code being the remaining portion of the operating system, so that all the node including himself can enter the operating system mode simultaneously. Meanwhile, in case of a non-boot node, while it is at message receive wait state until instruction to start the operating system is arrived from the boot node, immediately upon receiving the message, it executes the operating code. In all the above procedure, a kernel copy occurs in parallel. Also, the node boot code is written as a part of the operating system kernel code, so that all the procedure from the start point at which the node boot code of the copied kernel is begun to the time to enter the operating system mode can be proceeded according to a same procedure in all the nodes.

From the foregoing, the present invention provides an outstanding effect that, in a method by which a same operating system kernel image is copied onto the memories of all the nodes constituting the system, execution of the operating system is started simultaneously and the progress state in the node booting procedure is monitored in the high-speed parallel computer, it can find a boot order and path from the node construction table managed by the firmware, copy only the effective kernel image onto the memory of the other nodes in parallel, informs the boot node of the state in which a copy is in progress to display it on the console terminal, and enables execution of the operating system to be started at the same time after the operating system kernel image is completely copied onto all the nodes.

While the present invention has been described and illustrated herein with reference to the preferred embodiment thereof, it will be understood by those skilled in the art that various changes in form and details may be made therein without departing from the spirit and scope of the invention.

What is claimed is:

1. A method of booting nodes in a high-speed parallel computer, comprising the steps of:

finding a logical boot path using a node configuration table managed by a firmware;

determining boot subject nodes so that a kernel image of operating system can be copied onto nodes simultaneously;

copying said kernel image onto the boot subject nodes by a boot node, said kernel image is loaded on memories of the boot node by said firmware; notifying a copy proceeding state to said boot node by means of a node in charge of the copy; displaying a boot proceeding state on a console terminal by said boot node: and starting said operating system if the boot node receives a message that the copy is completed from all the nods.

* * * * *